United States Patent [19]
Hashimoto et al.

[11] Patent Number: 5,121,729
[45] Date of Patent: Jun. 16, 1992

[54] KNOCKING CONTROL METHOD AND APPARATUS FOR INTERNAL COMBUSTION ENGINE

[75] Inventors: Atsuko Hashimoto; Wataru Fukui; Toshio Iwata, all of Himeji, Japan

[73] Assignee: Mitsubishi Denki Kabushiki Kaisha, Tokyo, Japan

[21] Appl. No.: 747,045

[22] Filed: Aug. 19, 1991

[30] Foreign Application Priority Data

Aug. 21, 1990 [JP] Japan .................. 2-218219

[51] Int. Cl.$^5$ .............................................. F02P 5/14
[52] U.S. Cl. .................. 123/425; 364/431.08
[58] Field of Search ............. 123/425, 422, 417, 435, 123/609; 364/431.08, 431.07, 569

[56] References Cited

U.S. PATENT DOCUMENTS

| | | | |
|---|---|---|---|
| 4,351,281 | 9/1982 | Geigar et al. | 123/425 |
| 4,448,163 | 5/1984 | Yoshida | 123/425 |
| 4,501,137 | 2/1985 | Aoki et al. | 123/425 |
| 4,620,518 | 11/1986 | Nagai | 123/425 |
| 4,626,997 | 12/1986 | Takada et al. | 364/431.05 |
| 4,633,835 | 1/1987 | Akasu | 123/425 |
| 4,649,888 | 3/1987 | Kawai et al. | 123/609 |
| 4,766,545 | 8/1988 | Nagai | 123/425 |
| 5,000,149 | 3/1991 | Onyama | 123/425 |
| 5,027,774 | 7/1991 | Dutkiewicz et al. | 123/435 |
| 5,054,448 | 10/1991 | Matsuoka et al. | 123/425 |
| 5,058,551 | 10/1991 | Nakinawa | 123/425 |

Primary Examiner—Raymond A. Neill
Attorney, Agent, or Firm—Sughrue, Mion, Zinn, Macpeak and Seas

[57] ABSTRACT

For suppression of knocking in an internal combustion engine, an engine vibration level is periodically generated at predetermined time intervals on the basis of an output signal of a knocking sensor which is installed for detecting the engine vibration, the engine vibration level thus generated being compared with a preset sensor failure level. When the vibration level remains lower than the preset sensor failure level successively throughout a period corresponding to a predetermined number of engine cycles, a knocking sensor failure indication signal is generated to thereby allow knocking control to be precautionarily performed for the safety of the engine operation.

7 Claims, 6 Drawing Sheets

KNOCKING CONTROL METHOD AND APPARATUS FOR INTERNAL COMBUSTION ENGINE

BACKGROUND OF THE INVENTION

The present invention relates generally to a knocking control method for suppressing a knocking phenomenon in an internal combustion engine (hereinafter also referred to as an engine for short) such as a gasoline engine for a motor vehicle as well as an apparatus for carrying out the same. More particularly, the invention is concerned with an improved knocking control method and apparatus for an engine which allow failure or fault of a knocking sensor to be detected with high reliability, to thereby ensure a fail-safe operation of the engine knocking control system.

In general, the internal combustion engine such as a gasoline engine for a motor vehicle includes a plurality of cylinders in each of which a fuel gas mixture is compressed and undergoes combustion at an optimal timing. In this conjunction, there has already been proposed and used widely in practical applications a microcomputer-based engine control unit (also known as ECU in abbreviation) for the purpose of controlling optimally the ignition timings as well as the sequence of fuel injections in association with the individual engine cylinders.

In connection with such engine operation control, it is known that when the ignition timing (usually given in terms of angular crank position or crank angle) is controlled to advance excessively, abnormal fuel combustion may take place, resulting in generation of vibrations or shock referred to as knocking of such magnitude which may eventually damage or injure the engine cylinders. In order to avoid such unwanted event, it is necessary to perform ignition timing control in such a manner that upon detection of abnormal vibrations or knocking, the ignition timing is shifted in a direction to afford an appropriate retard to the time point or timing at which fuel combustion takes place within the knocking cylinder.

For a better understanding of the background of the present invention, an engine knocking control system known heretofore will be described in some detail by reference to FIG. 5 which is a block diagram showing the general arrangement of a known knocking control system.

Figure 5:
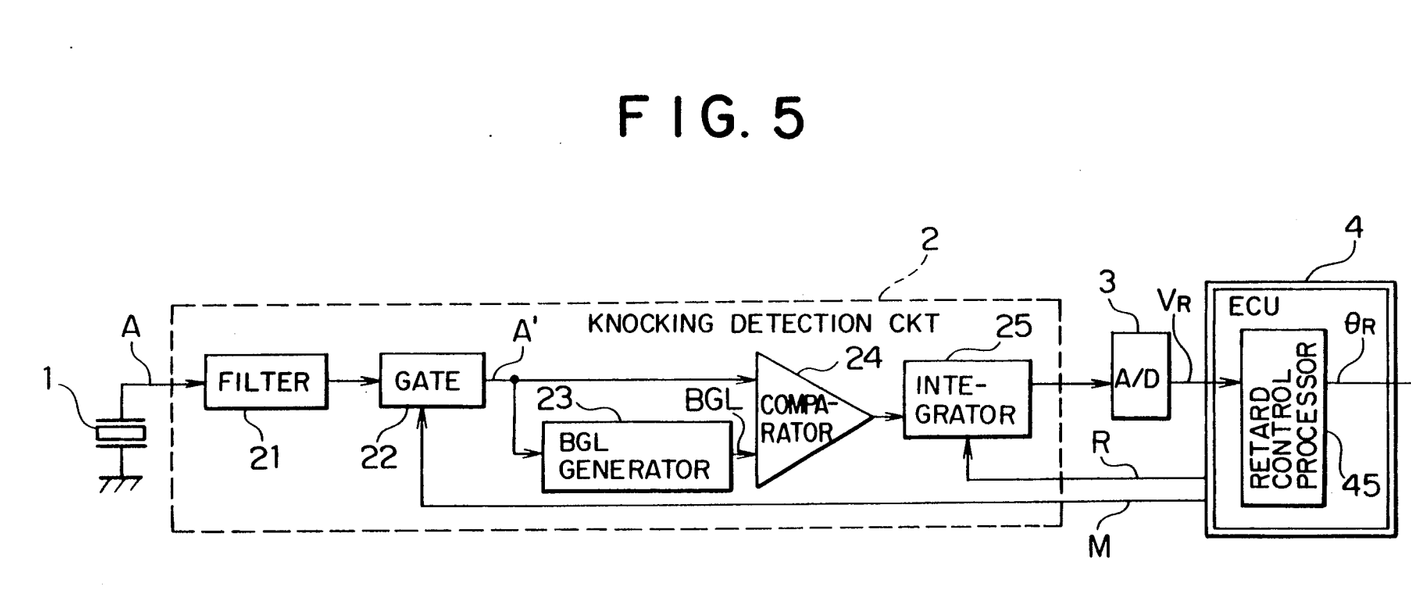
FIG. 5 is a block diagram showing the general arrangement of a known internal combustion engine knocking control apparatus.

In FIG. 5, a reference numeral 1 denotes a knocking sensor installed in association with each or a set of the cylinders of an internal combustion engine. The knocking sensor 1 may be composed of a piezoelectric element or the like which is capable of detecting the vibrations or knocking of the associated cylinder in the form of an electric signal.

An output signal A of the knocking sensor 1 is supplied to a knocking detection circuit denoted generally by a reference numeral 2. The knocking detection circuit 2 comprises a filter 21 having such a filtering characteristic as to pass therethrough only the frequency components which are peculiar to the knocking phenomenon (e.g., 7 kHz), a gate 22 for allowing the output signal of the filter 21 to pass therethrough periodically at a predetermined timing, a background level (BGL) generator 23 for generating a background level signal BGL on the basis of a signal derived by averaging an output signal A' of the gate 22, a comparator 24 for comparing the output signal A' of the gate 22 with the background level signal BGL for thereby producing an output signal of "ON" level when the gate output level A' exceeds the background level BGL, and an integrator 25 for integrating the output signal of the comparator 24. The output signal of the integrator 25 is then supplied to an analogue to digital (A/D) converter 3 to be converted to a digital signal $V_R$.

The digital signal $V_R$ is supplied to an engine control unit (ECU in abbreviation) 4 which may be constituted by a microcomputer which is programmed to perform ignition timing control for each of the engine cylinders on the basis of the output signal $V_R$ of the A/D converter 3 while supplying a masking pulse signal M to the gate 22 and a reset signal R to the integrator 25, respectively, for the purposes which will be described hereinafter. Further, the engine control unit or controller 4 includes an ignition retard control processor 45 for arithmetically determining an angle of retard for which the ignition timing is to be delayed for suppressing the knocking, thereby producing a retard control angle signal $\theta_R$ for controlling the amount of retard to be applied to the ignition timing on the basis of the digital signal $V_R$ outputted from the A/D converter 3.

Next, referring to a waveform diagram shown in FIG. 6, description will be made of operations performed by the known engine knocking control system shown in FIG. 5.

Normally, in each of the cylinders of the internal combustion engine, ignition takes place at a timing corresponding to a crank angle or position which advances approximately by 5° relative to top dead center (TDC given by the crank angle of 0°) so that explosive combustion of the fuel gas mixture may occur at a crank angle of about 10° to 60° after passing top dead center (TDC). The knocking due to abnormal combustion will thus occur at the timing falling within the crank angle range of 10° to 60° in succession to top dead center.

Figure 6:
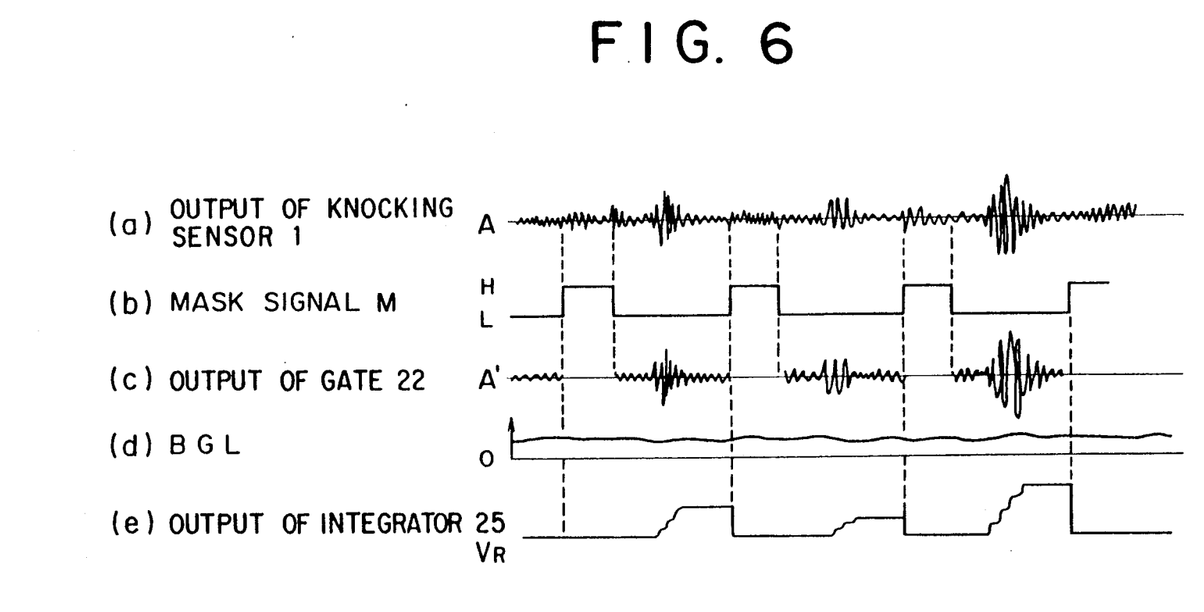

Accordingly, upon every occurrence of vibration noise of the cylinders and inter alia knocking, the output signal A of the knocking sensor 1 produced at corresponding periodical intervals assumes a significantly increased amplitude, as can be seen in the waveform shown in FIG. 6 at (a).

In the meanwhile, the engine control unit (ECU) 4 outputs to the gate 22 a masking pulse signal M which is inverted periodically at predetermined intervals in order to ensure that the knocking detection circuit 2 can efficiently receive and process the sensor output signal A. More specifically, the maksing pulse signal M is generated in such a waveform in which the leading edge thereof takes place at a time point corresponding to a crank angle of about 75° advancing relative to the top dead center of the associated cylinder (this advanced angle will hereinafter be represented by affixing "B" to the angle value, e.g. by "B75°") while the trailing edge of the masking pulse M occurs around a time point of B5° (i.e. at a time point corresponding to a crank angle of 5° before TDC), as can be seen in the waveform shown at (b) in FIG. 6. During the period in which the masking pulse assumes the level of "H", the gate 22 is blocked or disabled. Further, as mentioned previously, a reset signal R is outputted to the integrator 25 from the engine control unit 4 periodically at a predetermined timing which coincides with that of the leading edge of the masking pulse signal M.

The filter 21 constituting a part of the knock detection circuit 2 has such a filtering characteristic that the frequency components of the sensor output signal A produced upon occurrence of knocking can pass therethrough, while the gate 22 allows the sensor output signal A to pass therethrough only during a period in which the masking pulse signal M is at the level of "L", as shown at (c) in FIG. 6. The output of the gate 22 is denoted by a reference symbol A'. On the other hand, the background level (BGL) generator 23 generates a background level BGL contained in the gate output signal A' by discriminatively separating the former from the latter, as is illustrated at (d) in FIG. 6, wherein the background level BGL serves as a reference for detection of a knocking event or phenomenon.

When the gate output signal A' exceeds the background level BGL, the comparator 24 determines that knocking has taken place and produces a comparison output of "H" level. The integrator 25 starts to integrate the output signal of the comparator 24 every time it is reset by the reset signal R supplied from the engine control unit 4, as is illustrated at (e) in FIG. 6. The output signal of the integrator 25 is then converted form analog into digital form by the A/D converter 3, the resulting digital integration value $V_R$ being then inputted to the engine control unit (ECU) 4.

In this manner, the engine control unit 4 fetches therein the A/D converted integration value $V_R$ upon every occurrence of ignitions in the cylinder, to thereby generate a retard control angle signal $\theta_R$ for controlling the ignition timing in a sense to suppress knocking. To this end, the retard angle calculator 45 constituting a part of the engine control unit 4 accumulatively adds a current retard angle deviation $\Delta\theta_R$ to the preceding retard control angle $\theta_R^*$ used in the immediately preceding ignition control cycle to thereby generate a current retard control angle signal $\theta_R$. Accordingly, the current retard control angle $\theta_R$ can be given by the following expression:

$$\theta_R = \theta_R^* + \Delta\theta_R \tag{1}$$

In the above expression (1), the current retard angle deviation (i.e. increment or decrement) $\Delta\theta_R$ is given by the following equation:

$$\Delta\theta_R = V_R \times L$$

where L represents a weighing coefficient.

In conjunction with the knocking control or suppressing system described above, it is however noted that the knocking sensor 1 is susceptible to failure or fault due to short-circuiting, disconnection (or breakage) or the like. In such cases, there becomes no more available any meaningful sensor output signal A, making it impossible to identify discriminatively an occurrence of knocking, which would ultimately bring about a dangerous state of the internal combustion engine. Accordingly, it is necessary to detect the failure of the knocking detection sensor 1 for thereby effecting a precautionary or safety ignition timing retarding control upon detection of a failure of the knocking detection sensor 1.

With a view to coping with the undersirable situation mentioned above, there is hitherto known a so-called fail-safe ignition timing retarding control scheme in which when the background level BGL detected in the manner described hereinbefore assumes an abnormal value (e.g., of approximately zero level), it is determined that the knocking sensor 1 has failed, whereby a precautionary or safety ignition timing control is put into effect. As other measures for coping with the failure of the knocking sensor, it is also known to connect in advance the signal line for the knocking sensor output signal A to a power supply source via a resister (not shown in FIG. 5) and determine that there takes place a short-circuit failure of the knocking sensor 1 when the potential on the signal line becomes zero while deciding that disconnection or breakage failure takes place when the potential on the signal line assumes that of the power supply source.

As will now be understood from the foregoing, the engine knocking control method and system known heretofore suffers from disadvantages that additional hardware is required for detecting the failure of the knocking sensor 1 and that the ignition timing retarding control might be performed even upon erroneous detection of the knocking sensor failure, because no sensor failure detection means is incorporated in the engine control unit 4.

SUMMARY OF THE INVENTION

In view of the state of the art described above, it is a primary object of the present invention to provide an improved knocking control or suppressing method and apparatus for an internal combustion engine which are substantially immune to the shortcomings of the known knocking control technique such as mentioned above.

Another object of the present invention is to provide a knocking control or suppressing method and an apparatus which can enjoy an enhanced reliability of a knocking sensor function and hence an improved knocking control capability or performance by incorporating a sensor failure detecting function in the engine control unit for making decision as to the failure of the knocking sensor when an abnormal sensor output is successively detected for a predetermined number of times.

In view of the above and other objects which will be apparent as description proceeds, there is provided according to an aspect of the present invention a knocking control apparatus for an internal combustion engine which comprises a knocking sensor for detecting vibration of the internal combustion engine; vibration level generating means operatively connected to an output of the knocking sensor for generating a vibration level representative of the magnitude of the engine vibration on the basis of an output signal of the knocking sensor; arithmetic means for generating a threshold level to be referred to upon making decision as to an occurrence of knocking on the basis of the vibration level; comparison means for comparing the vibration level with the threshold level and generating a knocking identification signal when the vibration level exceeds the threshold level; sensor failure detecting means for generating a sensor failure indication signal indicative of a failure of the knocking sensor when the vibration level continues to remain at a predetermined sensor failure level for a predetermined period; and knocking control means responsive to either one of the knock identification signal and the sensor failure indication signal for controlling engine operating parameters so as to suppress the knocking.

With the structure of the knocking control apparatus according to the invention described above, the engine operating parameters are controlled on the basis of the knocking identification signal or the sensor failure indication signal so that the ignition timing of the knocking cylinder is properly retarded for suppressing the knocking.

According to another aspect of the present invention, there is provided a method of controlling knocking in an internal combustion engine, comprising the steps of: periodically generating a vibration level at predetermined time intervals in synchronism with operating cycles of the engine on the basis of an output signal of a knocking sensor which is installed for detecting vibration of the engine; comparing a difference between a current vibration level generated in a current engine cycle and a preceding vibration level generated in a preceding engine cycle with a predetermined sensor failure value; incrementing a failure counter every time the difference is smaller than the predetermined sensor failure value; resetting the failure counter when the difference is greater than the predetermined sensor failure value; determining whether or not a count value of the failure counter has reached a predetermined value representative of a predetermined number of engine cycles; setting a failure flag indicative of a failure of the knocking sensor when the count value of the failure counter has reached the predetermined value; and controlling engine operating parameters so as to suppress the knocking when the failure flag is set.

In the above-described knocking control method, a difference between the current and preceding vibration levels is utilized for making decision as to an occurrence of a faille of the knocking sensor. More specifically, in case the difference remains smaller than the failure indication value successively for a predetermined number of times, decision is made that the knocking sensor suffers a failure, whereon ignition retarding control is performed for precautionarily ensuring the safety of the engine operation.

According to a further aspect of the present invention. there is provided a method of controlling knocking in an internal combustion engine, comprising the steps of: periodically generating a vibration level at predetermined time internals in synchronism with operating cycles of the engine on the basis of an output signal produced by a knocking sensor which is installed for detecting vibration of the engine; comparing the vibration level with a predetermined sensor failure level indicative of a failure of the knocking sensor; incrementing a failure counter when the vibration level is lower than the sensor failure level; resetting the failure counter when the vibration level is higher than the sensor failure level; determining whether or not a count value of the failure counter has reached a predetermined value indicative of a predetermined number of engine cycles; setting a failure flag indicative of a failure of the knocking sensor when the count value of the failure counter has reached the predetermined value; and controlling engine operating parameters so as to suppress the knocking when the failure flag is set.

In the above knocking control method, precautionary knocking suppression control is performed when the vibration level lower than the predetermined failure indication level continues to exist for a predetermined period.

Other objects, advantages and novel features of the present invention will become more apparent from the following detailed description thereof, when it is considered in conjunction with the accompanying drawings.

BRIEF DESCRIPTION OF THE DRAWINGS

FIGS. 2 (a)-(c) are waveform diagrams for illustrating operations of the knocking control apparatus shown in FIG. 1;

FIGS. 6 (a)-(e) are waveform diagrams for illustrating operations of the known knocking control apparatus shown in FIG. 5.

DESCRIPTION OF THE PREFERRED EMBODIMENTS

Now, the present invention will be described in detail in conjunction with preferred embodiments thereof by reference to the accompanying drawings.

Figure 1:
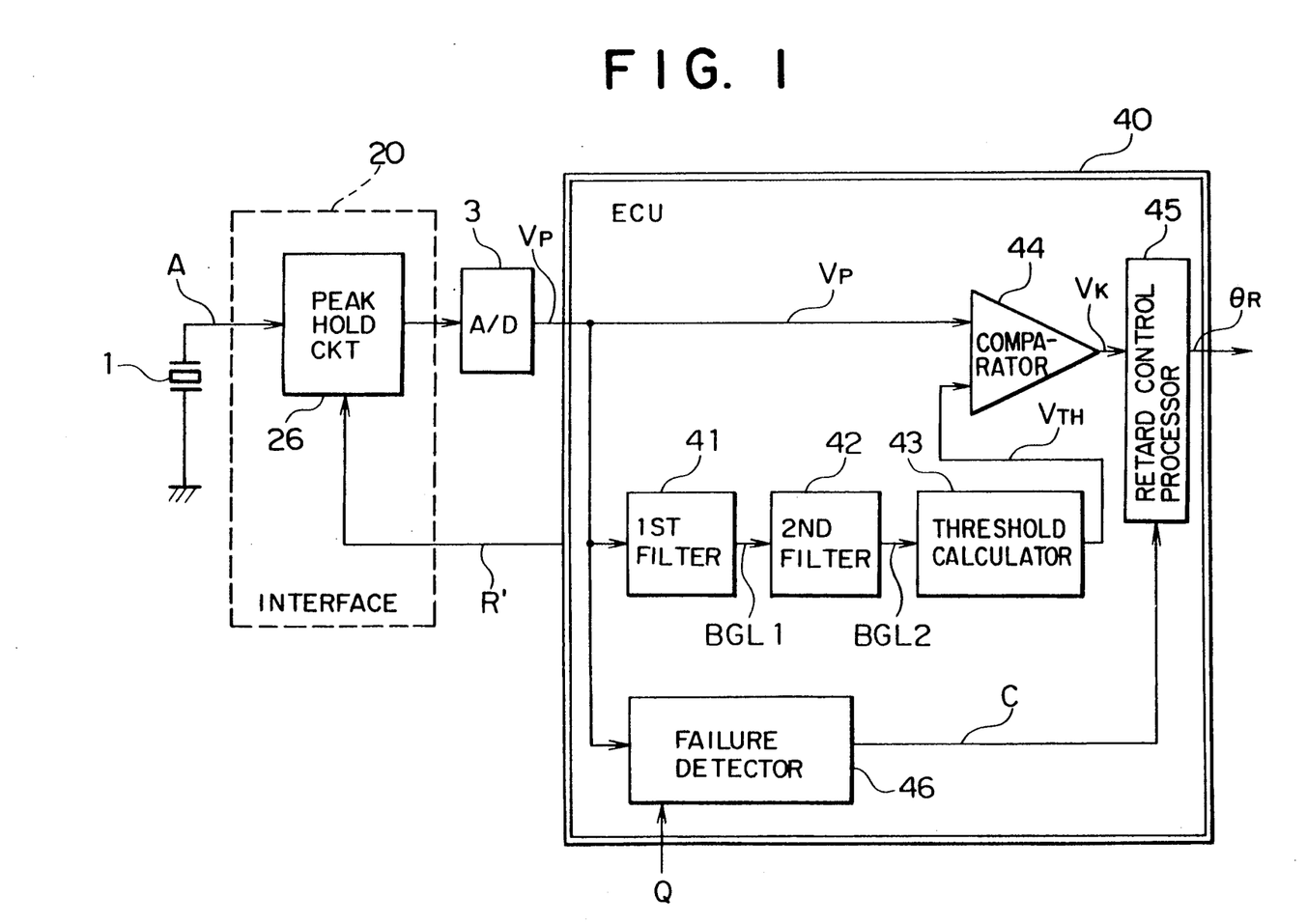
FIG. 1 is a block diagram showing a general arrangement of an internal combustion engine knocking control apparatus according to an embodiment of the present invention.

FIG. 1 shows in a block diagram the general arrangement of a knocking control or suppressing apparatus for an internal combustion engine according to an embodiment of the invention. In this figure, reference numerals 1, 3 and 45 denote a knocking detection sensor, an analog-to-digital (A/D) converter and a retard control processor, respectively, which serve for same or similar functions as the corresponding ones of the known system described hereinbefore by reference to FIGS. 5 and 6. Accordingly, repeated description of these parts will be unnecessary.

Figure 2:
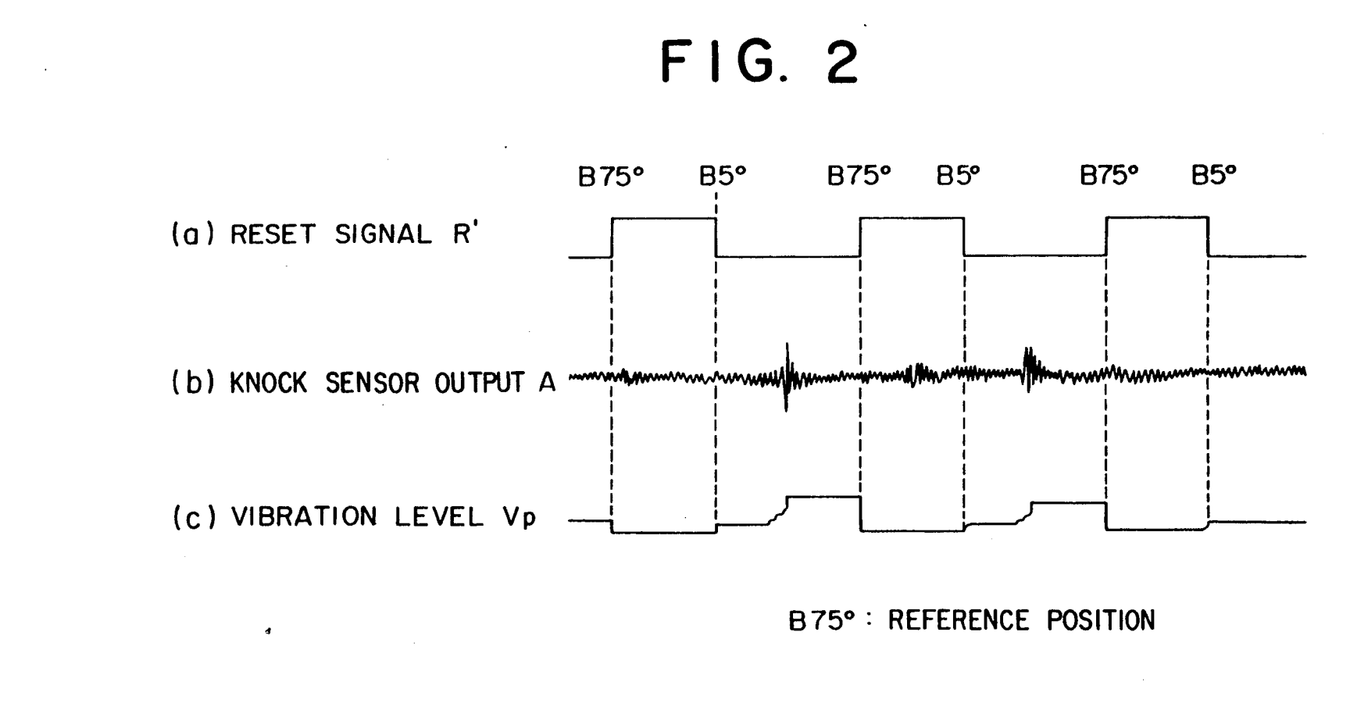

Referring to FIG. 1, there is interposed between the knocking detection sensor 1 and the A/D converter 3 an interface circuit 20 which may be constituted by a peak hold circuit 26. In this connection, it should be mentioned that a reset signal R' for resetting the peak hold circuit 26 is generated by the engine control unit (ECU) 40 in synchronism with the rotation of an internal combustion engine of concern. Referring to FIG. 2 which is a waveform diagram for illustrating operations of the knocking control apparatus shown in FIG. 1, the reset signal R' includes a series of pulses each rising up at a reference crank angle of B75° (i.e. at 75° before top dead center of an associated cylinder) and falling at another reference crank angle of B5° (i.e. at 5° before top dead center). The peak hold circuit 26 operates to generate a peak level at the reference crank position of B75° for the associated cylinder, wherein the peak level is inputted to the engine control unit (ECU) 40 as a vibration level $V_P$ by way of the A/D (analogue-to-digital) converter 3.

The engine control unit (ECU) 40 includes a first filter circuit 41 for smoothing out or averaging the vibration signal $V_P$ detected for each cylinder by the piezoelectric sensor 1 to thereby generate a first background level (a first mean value signal) BGL1, a second filter circuit 42 for performing an averaging operation on the first mean value signal BGL1 periodically at a predetermined time interval to thereby generate a second background level signal (a second mean value signal) BGL2, an arithmetic circuit 43 for generating a threshold level signal $V_{TH}$ on the basis of the second mean value signal BGL2, the threshold level $V_{TH}$ serving as a reference upon making decision as to an occurrence of knocking, a comparison circuit 44 for generating a knocking identifying signal Vk when the vibration signal $V_P$ exceeds the threshold level $V_{TH}$, a retard control processor 45 for generating a retarded control angle signal $\theta_R$ to retard the ignition timing for the associated engine cylinder on the basis of the knocking identifying signal Vk or a sensor failure indication signal C, and a sensor failure detector 46 for outputting the sensor failure indication signal C when the vibration signal level $V_P$ exceeds a failure level successively a predetermined number of cycles.

Next, referring to waveform diagrams shown in FIG. 2, description will be made of operations of the engine knocking control apparatus of FIG. 1.

The knocking sensor 1 detects vibrations of an associated cylinder of the engine to thereby generate an output signal A which is then subject to knocking phenomenon detection processing, as described previously. The engine control unit 40 fetches therein the peak level of the output signal A produced by the knocking sensor 1 after being A/D converted by the A/D converter 3 upon every ignition.

More specifically, the peak hold circuit 26 serves to hold a peak level of the output signal A of the knocking sensor 1, wherein the peak level is inputted to the engine control unit (ECU) 40 after having been converted to the digital vibration level signal $V_P$ by the A/D converter 3.

Upon every sampling of the vibration level signal $V_P$ at the reference angular position B75°, the engine control unit (ECU) 40 outputs the reset signal R', as illustrated in FIG. 2 at (a), for resetting the peak hold circuit 26 at the reference position B75° (in actuality, slightly delayed relative to the reference position B75°).

So long as the reset signal R' remains at "ON" level, the peak hold circuit 26 continues to be in the reset state and regains its operation, starting from a time point corresponding to the falling edge of the reset signal R' (i.e. at an angular position B5° in the case of the illustrated embodiment). Thus, every time the vibration level signal $V_P$ is produced at the reference position of B75°, the engine control unit (ECU) 40 repetitively executes the interrupt processing routine as described before.

As can be seen from the waveform shown at (c) in FIG. 2, the vibration level signal $V_P$ available at the reference position B75° of each cylinder is subjected to variations in every sampling cycle in dependence on the vibration components contained in the output signal A of the knocking sensor 1. The variation component in the vibration level signal $V_P$ contains not only a knocking component but also noise. Accordingly, in order to positively detect knocking with a high degree of reliability while taking into account variations in the vibration level signal $V_P$ due to degradation of the knocking sensor in the course of time lapse, it is necessary to determine the background level BGL which follows up the vibration level $V_P$ to some extent. However, in that case, there arises the possibility that knocking detection can no more be performed with high reliability because the threshold level $V_{TH}$ rapidly increases in response to a rapid increase in the vibration level $V_P$, the background level BGL changing to follow the vibration level $V_P$.

Under these circumstances, the first filter circuit 41 incorporated in the engine control unit (ECU) 40 is so designed as to average the vibration level $V_P$ on the basis of a predetermined constant $N_1$ to thereby generate a first mean value signal (first background signal) BGL1 in accordance with the following expression:

$$BGL1 = BGL1^*(N_1-1)/N_1 + V_P/N_1$$

where BGL1* represents a first mean value determined in the preceding cycle. As will be understood from the above expression, the first mean value BGL1 thus determined corresponds to the preceding first mean value BGL1* which is updated so as to reflect the current vibration level $V_P$ at every cycle.

On the other hand, the second filter circuit 42 is so designed as to perform a timer interrupt processing at every predetermined time to thereby execute a further averaging operation on the first average value BGL1 outputted from the first filter circuit 41 for deriving a second average value BGL2 in accordance with:

$$BGL2 = BGL2^*(N_2-1)/N_2 + BGL1/N_2$$

where BGL2* represents a second mean value derived in the preceding cycle, and $N_2$ represents a predetermined averaging constant.

As will be understood from the above expression, the current second mean value BGL2 corresponds to the preceding one BGL2* which has been shifted or updated so as to reflect the current first mean value BGL1 and is rewritten at every cycle. Through the averaging operation described above, there can be obtained the second mean value signal BGL2 which can assume a substantially stabilized level to which the variation in the vibration level signal $V_P$ provides scarcely an appreciable contribution. Parenthetically, the constants $N_1$ and $N_2$ can be selected rather arbitrarily.

Subsequently, the B75° interrupt processing routine mentioned previously is executed, wherein the arithmetic unit 43 amplifies the second mean value signal BGL2 and adds thereto an offset $V_{OF}$ to thereby determine ultimately the threshold level $V_{TH}$ which is referred to upon making decision as to the occurrence of knocking. To this end, the arithmetic unit 43 is designed to perform the following arithmetic operation:

$$V_{TH} = K \times BGL2 + V_{OF}$$

where K represents an amplification factor. Since the second mean value BGL2 is sufficiently smoothed, as described above, the threshold level $V_{TH}$ can assume a value of high reliability because reflection of the variation in the cyclical vibration level signal $V_P$ on the threshold level $V_{TH}$ can satisfactorily be suppressed.

Subsequently, the comparison circuit 44 constituting the knocking detecting means compares the vibration level signal $V_P$ with the threshold level signal $V_{TH}$ to determine a difference Vk between the levels $V_P$ and $V_{TH}$, which difference is given by the following equation:

$$Vk = V_P - VTH$$

Thereafter, polarity of the difference Vk is decided (i.e. decision is made as to whether the difference Vk is positive or not). When the vibration level $V_P$ exceeds the threshold level $V_{TH}$, i.e. when Vk>0 (positive), then the difference signal is outputted as the knocking identification signal Vk indicating an occurrence of knocking.

In response to the knocking identification signal Vk thus derived, the retard control processor 45 arithmetically determines a retard angle signal $\Delta\theta_R$ required for the suppression of knocking in accordance with the following equation:

$$\Delta\theta_R = (Vk/V_{TH}) \times L'$$

where L' represents a weighing constant.

As will be understood from the above equation, since the retard angle signal $\Delta\theta_R$ is arithmetically determined in terms of the ratio between the knocking identification signal Vk and the threshold level $V_{TH}$, there is always available the retard angle signal $\Delta\theta_R$ of a correct or appropriate value notwithstanding of variations in the vibration level $V_P$ itself due to time-dependent degradation of the knocking sensor.

Further, the retard control processor 45 arithmetically determines the retard control angle $O_R$ for retarding the ignition timing in a sense to suppress the knocking on the basis of the retard angle signal $\Delta\theta_R$ in accordance with the previously mentioned expression (1). Namely, $$\theta_R = \theta_R^* + \Delta\theta_R$$

where $\theta_R^*$ represents the retard control angle employed in the preceding cycle.

On the other hand, when it is decided as a result of the comparison mentioned previously that Vk<0, no knocking identification signal Vk is outputted. Consequently, the retard angle signal $\Delta\theta_R$ takes a value of "0" (zero), resulting in that the retard control angle signal $\theta_R$ continues to be held at the preceding value.

In this manner, the ignition timing for the cylinder subjected to the knocking control is modified or corrected by the retard control angle signal $\theta_R$ in a sense to retard the ignition timing, whereby the occurrence of knocking can satisfactorily be suppressed.

In conjunction with the knocking control system described above, a problem arises that the knocking detection is rendered impossible, when failure such as short-circuiting, disconnection or breakage or the like occurs in the knocking detection sensor 1. To cope with this problem, there is provided the failure detector 46 which outputs a failure indication signal C when the vibration level signal $V_P$ exhibits a failure level throughout a predetermined number of cycles. The failure indication signal C is also supplied to the retard control processor 45 which, in response thereto, performs fail-safe retard control of the ignition timing in a similar manner as in the case of the detection of knocking described hereinbefore.

In this connection, it should again be mentioned that the failure detector 46 is so designed as to output the failure indication message C only when the failure level of the vibration signal $V_P$ is detected successively throughout a predetermined number of engine cycles. Thus, there can be excluded any useless retard control which might otherwise be performed on the basis of erroneous detection of a failure level.

In the case of the exemplary embodiment of the engine knocking control apparatus described above, the interface circuit 20 for generating the vibration level signal $V_P$ is constituted by the peak hold circuit 26. However, it goes without saying that the interface circuit 20 may equally be constituted by an integrator with substantially the same result.

Further, although the difference Vk between the vibration level signal $V_P$ and the threshold level $V_{TH}$ is outputted from the comparison circuit 44 as a knocking identification signal, it should be understood that the comparison circuit 44 may be so configured as to produce simply an output signal of "H" level when the vibration level $V_P$ exceeds the threshold level $V_{TH}$.

Figure 3:
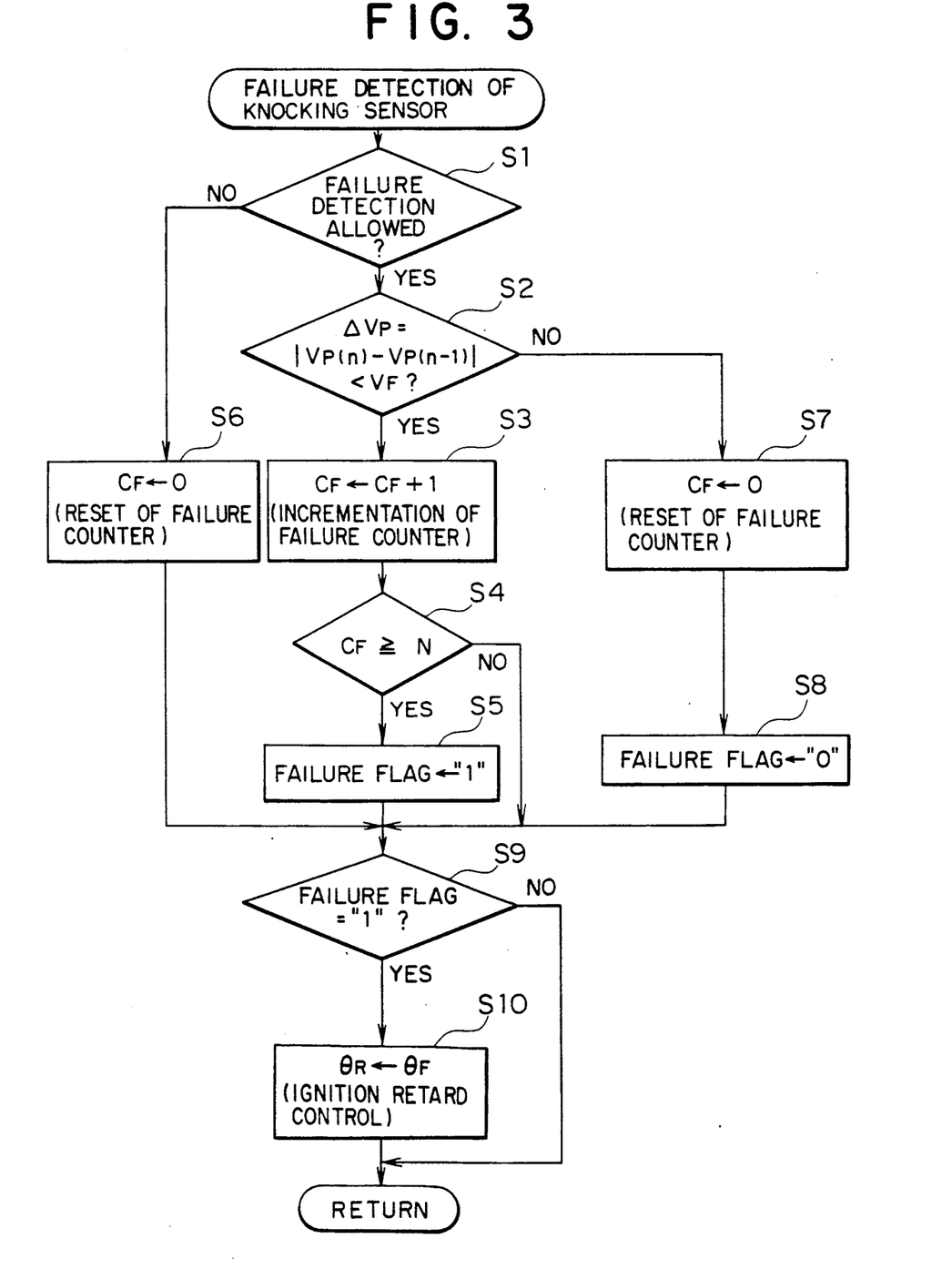
FIG. 3 is a flow chart for illustrating an internal combustion engine knocking control method according to an embodiment of the present invention.

Next, referring to FIG. 3, description will be made of an engine knocking control method according to an embodiment of the present invention. Parenthetically, it should be noted that a failure detection routine (including steps S1 to S8) shown in FIG. 3 is executed by the failure detection circuit 46.

First, in step S1, decision is made as to whether or not the current operating state Q of the engine is a steady state (i.e., not a transient state) in which the processing for detecting a failure of the knocking sensor is allowed to be executed. When the answer of this decision in step S1 is affirmative (YES), a difference or deviation $\Delta V_P$ corresponding to a variation in the vibration level $V_P$ is determined in accordance with the following equation:

$$\Delta V_P = |V_P(n) - V_P(n-1)|$$

where $V_P(n)$ represents the current vibration level and $V_P(n-1)$ represents the vibration level in the preceding engine cycle. Subsequently, the deviation $\Delta V_P$ is compared with a predetermined failure indication level $V_F$ to thereby make decision as to whether the deviation $\Delta V_P$ is smaller than the predetermined failure indication level $V_F$ (step S2). Incidentally, the failure indication level $V_F$ may be modified in dependence on the engine operating state. By way of example, in a high-speed operating state, the predetermined failure indication level $V_F$ may be set to a relatively high level.

When the deviation $\Delta V_P$ is smaller or lower than the predetermined failure indication level $V_F$, a failure counter $C_F$ is incremented in step S3. In step S4, it is checked whether the count value of the failure counter $C_F$ has reached a predetermined number N.

In case the count value of the failure counter $C_F$ has reached the predetermined number N, it is then decided that the knocking sensor 1 of the cylinder being monitored has undergone failure such as short-circuiting, disconnection or breakage or the like, as mentioned previously, whereon a failure flag corresponding to the failure indication signal C is set to "1" in step S5.

On the other hand, when it is decided in step S1 that the current state is not in the region allocated to the sensor failure detection (i.e. when the answer in step S1 is negative "NO"), the failure counter $C_f$ is reset to "0" (zero) is step S6. Further, when it is decided at step S2 that the deviation $\Delta V_P$ exceeds the failure indication level $V_F$, thus indicating that the knocking sensor is normal, the failure counter $C_F$ is reset to "0" in step S7 to thereby reset the failure flag to "0" in step S8.

Now, in step 9, the retard control processor 45 makes decision as to whether or not the failure flag is set to "1". If it is set, the ignition timing for the cylinder associated with the knocking sensor 1 for which the failure flag is set to "1" is controlled to retard for precautionarily ensuring the safety engine operation in step S10. To this end, the retard control angle $\theta_R$ is set to a fail-safe retard control angle $\theta_F$.

On the other hand, when it is decided in step S9 that the failure flag is not set, a return is performed to the initial state.

The sequence of the processing steps S1 to S10 described above is repeatedly executed every time the vibration level $V_P$ develops.

As will be appreciated from the foregoing description, it is taught according to an aspect of the invention that the difference or deviation between the current and preceding vibration levels is utilized for making decision as to a failure of the knocking sensor. More specifically, when the deviation $\Delta V_P$ continues to be smaller or lower than the predetermined failure indication level $V_F$ for a predetermined period, it is decided that the knocking sensor suffers a failure or fault (step S5), whereon the ignition timing retarding (knocking suppressing) control is performed in step S10 for precautionarily ensuring the safety of the engine operation. By making use of the deviation $\Delta V_P$ in making decision of the sensor failure as described above, noise components contained in the vibration level signal $V_P$ can be eliminated, whereby reliability in the engine knocking control or suppressing system is significantly enhanced.

Figure 4:
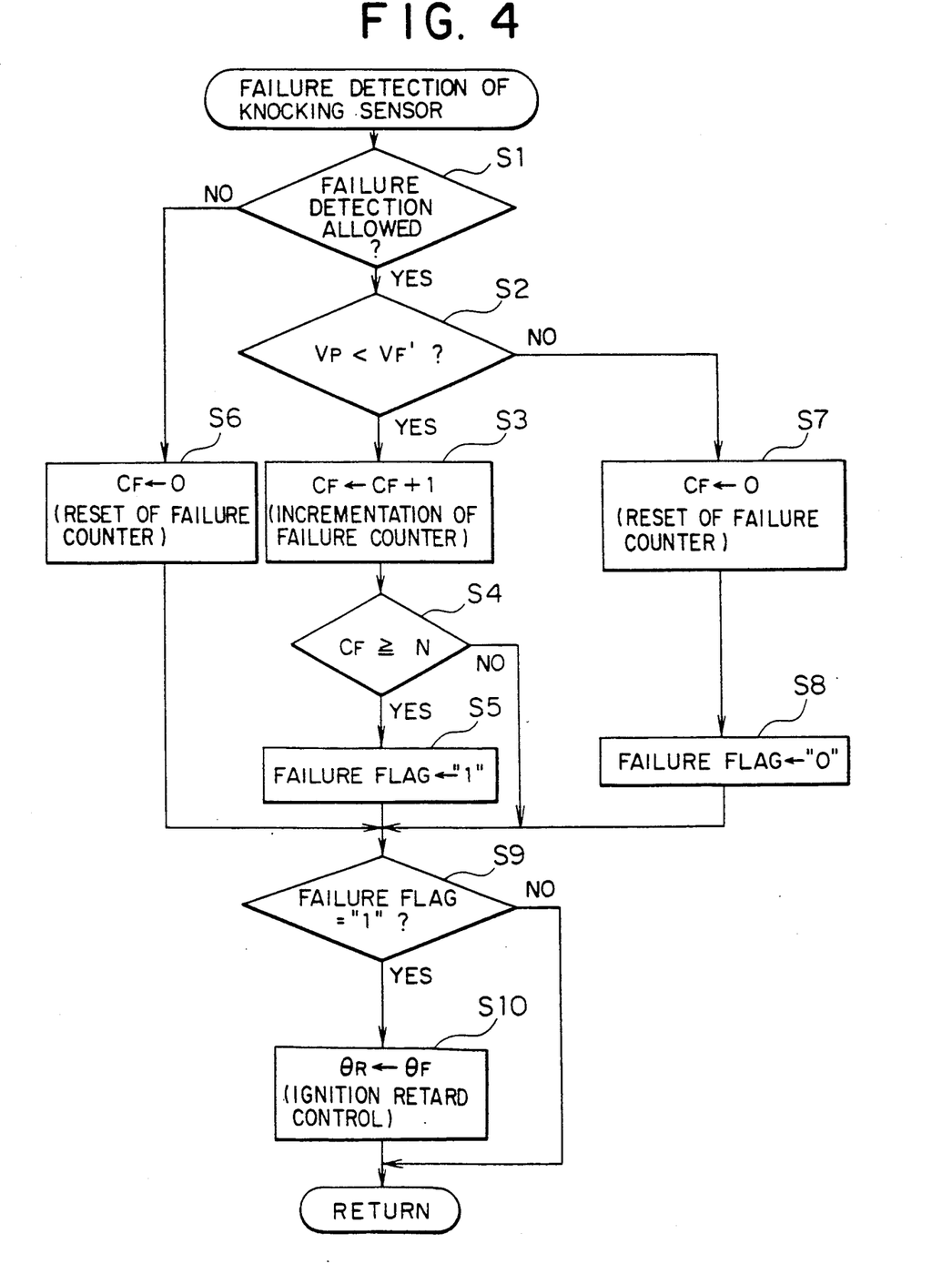
FIG. 4 is a flow chart for illustrating an internal combustion engine knocking control method according to another embodiment of the present invention.

Next, referring to FIG. 4, description will be made of another embodiment of the engine knocking control or suppression method according to the present invention. In FIG. 4, steps S1 and S3 to S10 are same as those described above by reference to FIG. 3.

Turning now to FIG. 4, the vibration level $V_P$ is compared with the predetermined sensor failure indication level $V_F'$ in the failure detection dedicated state (step S12). Whenever it is decided that the vibration level $V_P$ is smaller or lower than the failure indication level $V_F'$, the failure counter $C_F$ is incremented (step S3). Parenthetically, the sensor failure indication level $V_F$ may be set variable in dependence on the engine operating state.

When the count value of the failure counter $C_F$ has attained a predetermined number N, the failure flag is set to "1" in step S5, while upon decision that the vibration level $V_P$ is higher than the failure indication level $V_F'$, the failure counter $C_F$ is reset (step S7), to thereby reset the failure flag (step S8). On the basis of the failure flag $C_F$, the ignition timing for the cylinder to which the failed sensor belongs is controlled by the fail-safe ignition retarding control method (step S10).

Parenthetically, the failure indication level $V_F'$ may be selected either by looking at a corresponding map by using parameters representative of different engine operating states or set to a value resulting from addition of the second mean value BGL2 mentioned hereinbefore with a correcting value. In the latter case, since the vibration level $V_P$ coincides approximately with the second mean value BGL2 upon occurrence of a failure of the knocking sensor, the above-mentioned correcting value may be so selected as to correspond to a margin afforded to the failure detection, whereby the failure or fault of the knocking sensor can be detected without fail.

In the foregoing description, it has been assumed that the ignition timing is controlled to retard for suppressing the knocking phenomenon. It should however be appreciated that the knock suppression control may be accomplished by making use of other appropriate control parameters.

While the invention has been described in terms of its preferred embodiments, it should be understood that numerous modifications may be made thereto without departing form the spirit and scope of the invention as defined in the appended claims. It is intended that all such modifications fall within the scope of the claims.

What is claimed is:

1. A knocking control apparatus for suppressing knocking in an internal combustion engine, comprising:
   a knocking sensor for detecting vibration of the internal combustion engine;
   vibration level generating means operatively connected to an output of said knocking sensor for generating a vibration level representative of the magnitude of the engine vibration on the basis of an output signal of said knocking sensor;
   arithmetic means for generating a threshold level to be referred to upon making decision as to an occurrence of knocking on the basis of said vibration level;
   comparison means for comparing the vibration level with the threshold level and generating a knocking identification signal when the vibration level exceeds the threshold level;
   sensor failure detecting means for generating a sensor failure indication signal indicative of a failure of said knocking sensor when the vibration level continues to remain at a predetermined sensor failure level for a predetermined period; and
   knocking control means responsive to either one of the knock identification signal and the sensor failure indication signal for controlling engine operating parameters so as to suppress the knocking.

2. A knocking control apparatus for an internal combustion engine according to claim 1, wherein one of said engine operating parameters is an ignition timing for an engine cylinder whose vibration is to be detected by said knocking sensor, the ignition timing being retarded by said knocking control means for suppressing the knocking.

3. A knocking control apparatus for an internal combustion engine according to claim 2, wherein said vibration level generating means includes a peak hold circuit which is enabled periodically in synchronism with engine cycles to thereby hold and output a vibration signal representative of vibration of said engine cylinder which develops upon every occurrence of combustion therein, and wherein said sensor failure detecting means includes means for comparing the predetermined sensor failure level with a difference between the magnitude of a current vibration signal outputted in a current engine cycle and that of a preceding vibration signal outputted in a preceding engine cycle, to thereby output the sensor failure indication signal, when the difference remains smaller than the predetermined sensor failure level successively throughout a period corresponding to a predetermined number of engine cycles.

4. A knocking control apparatus for an internal combustion engine according to claim 3, wherein the predetermined sensor failure level is set variable in dependence on the operating state of said engine.

5. A knocking control apparatus for an internal combustion engine according to claim 3, wherein said arithmetic means averages a plurality of successive outputs of said peak hold circuit to provide the threshold level, and wherein said knocking control means retards the ignition timing by an amount corresponding to a quotient resulting from division of a difference between the threshold level and the vibration level by said threshold level.

6. A method of controlling knocking in an internal combustion engine, comprising the steps of:

periodically generating a vibration level at predetermined time intervals in synchronism with operating cycles of the engine on the basis of an output signal of a knocking sensor which is installed for detecting vibration of the engine;

comparing a difference between a current vibration level generated in a current engine cycle and a preceding vibration level generated in a preceding engine cycle with a predetermined sensor failure value;

incrementing a failure counter every time the difference is smaller than the predetermined sensor failure value;

resetting said failure counter when the difference is greater than the predetermined sensor failure value;

determining whether or not a count value of said failure counter has reached a predetermined value representative of a predetermined number of engine cycles;

setting a failure flag indicative of a failure of said knocking sensor when the count value of said failure counter has reached the predetermined value; and controlling engine operating parameters so as to suppress the knocking when the failure flag is set.

7. A method of controlling knocking in an internal combustion engine, comprising the steps of:

periodically generating a vibration level at predetermined time internals in synchronism with operating cycles of the engine on the basis of an output signal produced by a knocking sensor which is installed for detecting vibration of the engine;

comparing the vibration level with a predetermined sensor failure level indicative of a failure of said knocking sensor;

incrementing a failure counter when the vibration level is lower than the sensor failure level;

resetting said failure counter when the vibration level is higher than the sensor failure level;

determining whether or not a count value of said failure counter has reached a predetermined value indicative of a predetermined number of engine cycles;

setting a failure flag indicative of a failure of said knocking sensor when the count value of said failure counter has reached the predetermined value; and controlling engine operating parameters so as to suppress the knocking when the failure flag is set.

* * * * *